United States Patent
Kim et al.

(10) Patent No.: US 8,441,675 B2
(45) Date of Patent: May 14, 2013

(54) IMAGE PROCESSING APPARATUS, IMAGE PROCESSING METHOD AND IMAGE FORMING APPARATUS THEREOF

(75) Inventors: Haeng-nan Kim, Suwon-si (KR); Jun-hyung Ha, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1322 days.

(21) Appl. No.: 12/147,741

(22) Filed: Jun. 27, 2008

(65) Prior Publication Data

US 2009/0015868 A1 Jan. 15, 2009

(30) Foreign Application Priority Data

Jul. 12, 2007 (KR) .................. 10-2007-0069954

(51) Int. Cl.
*G06K 15/00* (2006.01)
*G06F 3/12* (2006.01)
*H04N 1/40* (2006.01)
*G06K 9/00* (2006.01)
*G06K 9/36* (2006.01)

(52) U.S. Cl.
USPC ....... 358/1.18; 358/1.14; 358/1.15; 358/3.28; 382/100; 382/284

(58) Field of Classification Search .................. None
See application file for complete search history.

(56) References Cited

U.S. PATENT DOCUMENTS

| | | | |
|---|---|---|---|
| 7,742,196 B2 * | 6/2010 | Uchida et al. | 358/3.28 |
| 7,830,555 B2 * | 11/2010 | Katsurabayashi | 358/3.28 |
| 2003/0179407 A1 * | 9/2003 | Herr | 358/1.18 |
| 2003/0202213 A1 * | 10/2003 | Saito | 358/1.18 |
| 2003/0210803 A1 * | 11/2003 | Kaneda et al. | 382/100 |
| 2004/0243929 A1 * | 12/2004 | Jones et al. | 715/509 |
| 2005/0134901 A1 * | 6/2005 | Herr | 358/1.15 |
| 2005/0195436 A1 * | 9/2005 | Tanaka et al. | 358/1.18 |
| 2005/0257144 A1 | 11/2005 | Lee et al. | |
| 2006/0132354 A1 | 6/2006 | Beard et al. | |
| 2006/0232836 A1 * | 10/2006 | Yamada et al. | 358/527 |
| 2006/0285163 A1 | 12/2006 | Han et al. | |
| 2007/0127771 A1 * | 6/2007 | Kaneda et al. | 382/100 |
| 2007/0139707 A1 * | 6/2007 | Takami et al. | 358/1.15 |
| 2007/0168251 A1 * | 7/2007 | Hilbert et al. | 705/14 |
| 2007/0177181 A1 * | 8/2007 | Herr | 358/1.13 |
| 2008/0037040 A1 * | 2/2008 | Hashimoto et al. | 358/1.6 |
| 2009/0147304 A1 * | 6/2009 | Saito | 358/1.15 |
| 2010/0214612 A1 * | 8/2010 | Herr | 358/1.15 |
| 2011/0299794 A1 * | 12/2011 | Noguchi et al. | 382/284 |

FOREIGN PATENT DOCUMENTS

| | | |
|---|---|---|
| JP | 2002-175159 | 6/2002 |
| JP | 2002175159 | 6/2002 |
| KR | 1020050108935 | 11/2005 |
| KR | 1020060132354 | 12/2006 |
| KR | 1020070035335 | 3/2007 |

OTHER PUBLICATIONS

Korean Office Action Issued on Jan. 30, 2012 in KR Patent Application No. 10-2007-0069954.

* cited by examiner

*Primary Examiner* — Satwant Singh
(74) *Attorney, Agent, or Firm* — Stanzione & Kim, LLP (57) ABSTRACT

An image processing apparatus includes an image processor which generates printing data of a document displayed as a preview image and a controller which controls the image processor to generate the printing data from which a hidden region is excluded, the hidden region not being displayed when the document is previewed.

22 Claims, 8 Drawing Sheets

IMAGE PROCESSING APPARATUS, IMAGE PROCESSING METHOD AND IMAGE FORMING APPARATUS THEREOF

CROSS-REFERENCE TO RELATED APPLICATIONS

This application claims the benefit of Korean Patent Application No. 10-2007-0069954, filed on Jul. 12, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to an image processing apparatus, an image processing method and an image forming apparatus thereof, and more particularly, to an image processing apparatus which processes an image displayed on a display unit as a preview image to be formed on a printable medium, an image processing method and an image forming apparatus thereof.

2. Description of the Related Art

An image forming apparatus such as a printer, a fax machine and a copier receives printing data from an image processing apparatus, such as a personal computer (PC). The image forming apparatus forms an image on a printable medium such as paper, based on the received printing data. The image processing apparatus may include a display unit, such as a monitor. The display unit displays a video image of a printing object which is processed by the image processing apparatus to form the printing data. For example, the video image may be displayed on the display unit as a preview image (hereinafter, to be called "preview image") before being printed. The printing object may include documents, pictures, etc. (hereinafter, to be called "document").

It is natural that a print object is printed on the printable medium identical to the preview image which is currently displayed on the display unit. However, in some cases, an unexpected image corresponding to a region of the document that is not displayed on the display unit (hereinafter to be called "hidden region") may be formed on the printable medium. That is, an image other than the preview image which is displayed on the display unit may also be formed on the printable medium.

Figure 1:
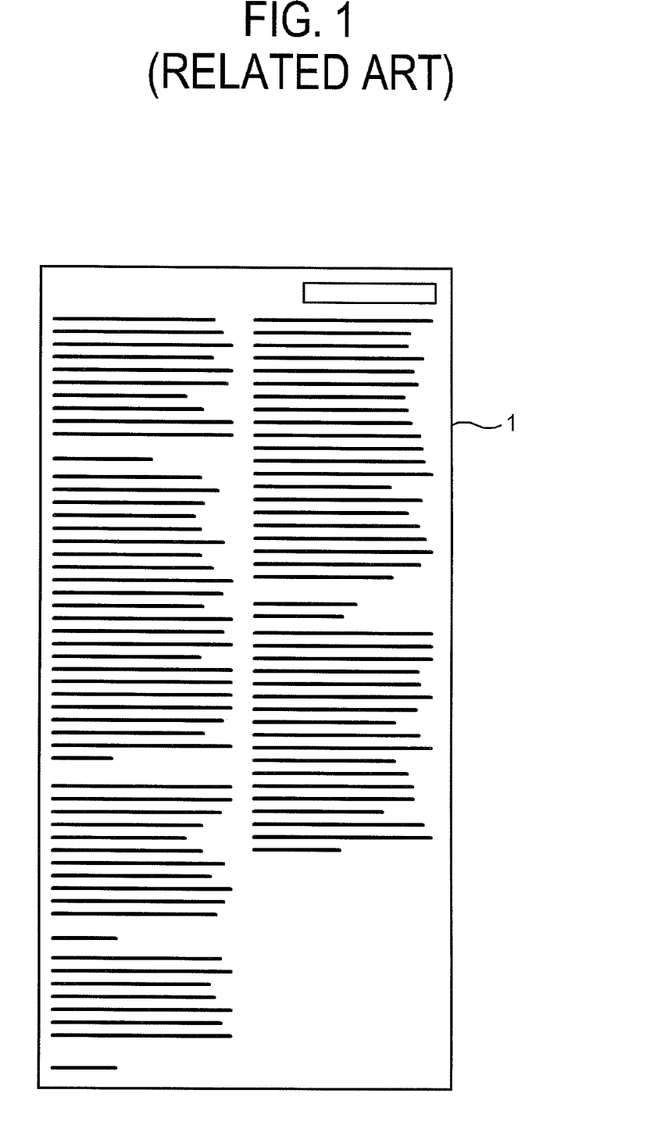
FIG. 1 is a view illustrating an image of a document that is displayed a preview image displayed on a display unit from which a hidden region is not displayed.

For example, a document with a form of a PDF file of Adobe™ System may have a hidden region that is not displayed on the preview image. As illustrated in FIG. 1, when the document including the hidden region is previewed as a preview image 1, the hidden region is not displayed on the display unit.

Figure 2:
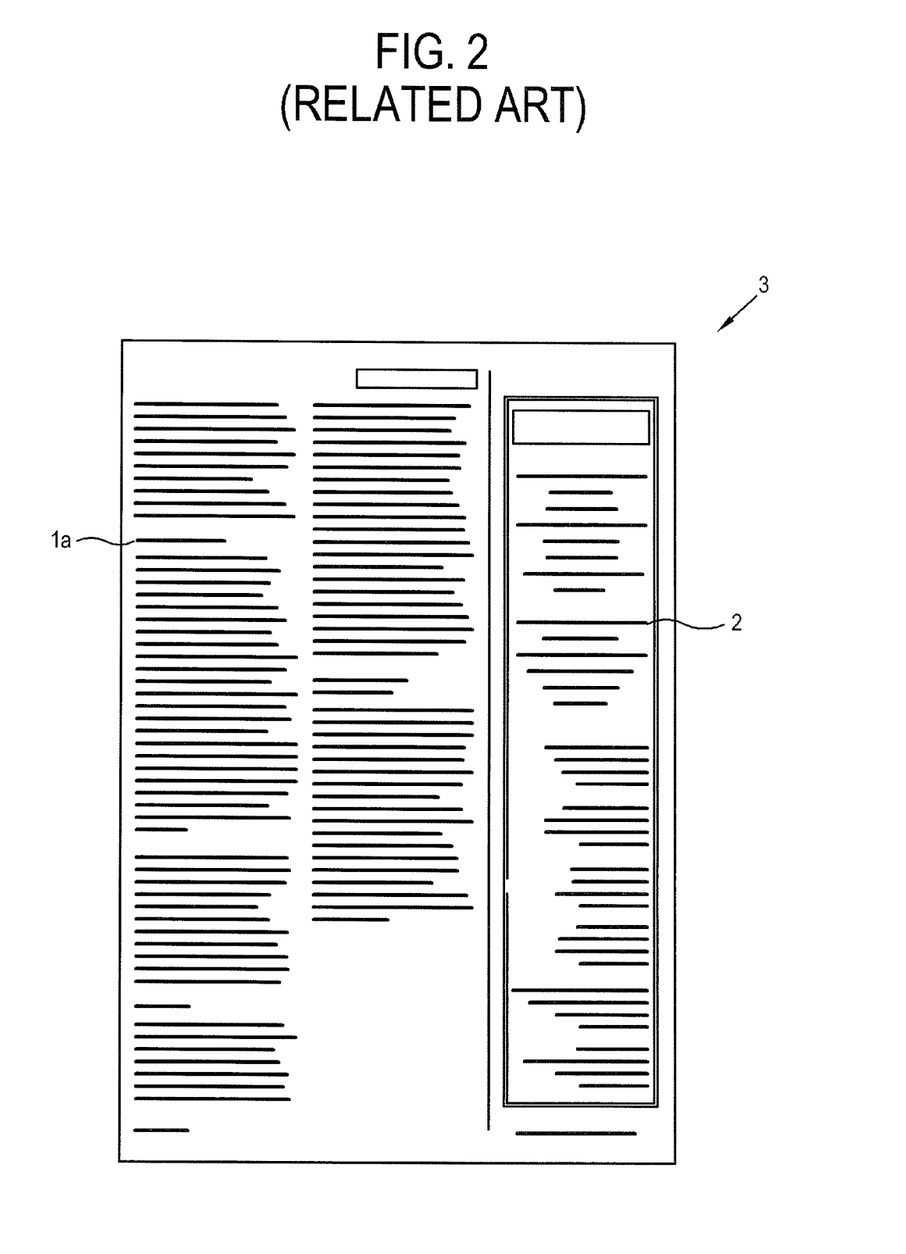
FIG. 2 is a view illustrating a printing result of the image in FIG. 1 according to a conventional image processing apparatus and image forming apparatus.

However, when the document is printed, the hidden region, although it was not displayed on the display unit or on the preview image 1, is printed on the printable medium. As illustrated in FIG. 2, an image 2 represents the hidden region, which is formed on a printable medium 3, together with an image 1a representing the preview image 1.

As described above, an unexpected printing result which prints out different than the preview image displayed on the display unit confuses a user. Also, consumables such as ink, toner, and the printable medium are wasted due to the printing of the unexpected image.

SUMMARY OF THE INVENTION

The present general inventive concept provides an image processing apparatus which does not print an unexpected part of a printing object and improves a user's convenience, and an image processing method and an image forming apparatus thereof.

Also, the present general inventive concept provides an image processing apparatus which does not print an unexpected part of a printing object and prevents or reduces waste of consumables, and an image processing method and an image forming apparatus thereof.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept may be achieved by providing an image processing apparatus, including an image processor which generates a first printing data of a document displayed as a preview image and a controller which controls the image processor to generate a second printing data from which a hidden region is excluded, the hidden region not being displayed when the document is previewed.

The controller may compare a size of a printable medium on which the document is to be printed, and a size of the displayed document to detect the hidden region.

The controller may compare the size of the printable medium and the size of the displayed document by using coordinate information.

The controller may display that the document includes the hidden region.

The second printing data from which the hidden region is excluded may be printed on the printable medium according to one of an absolute coordinate and a relative coordinate.

The foregoing and/or other aspects and utilities of the present general inventive concept are also achieved by providing an image processing apparatus, including an image processor which generates a first printing data of a document that is displayed as a preview image and a controller which controls the image processor to selectively perform one of generating the first printing data in which a hidden region is included and generating a second printing data from which the hidden region is excluded, the hidden region not being displayed when the document is previewed.

The image processing apparatus may further include a user input unit which receives a command from a user, wherein the controller determines whether to include the hidden region in the second printing data according to the user's command.

The foregoing and/or other aspects and utilities of the present general inventive concept may be achieved by providing an image processing method, including detecting a hidden region of a document which is not displayed when the document is previewed and generating printing data to exclude the detected hidden region from the printing data.

The detecting the hidden region may include comparing a size of a printable medium on which the document is to be printed, and a size of the displayed document.

The comparing the size of the printable medium and the size of the displayed document may include comparing the size of the printable medium and the size of the document by using coordinate information.

The image processing method may further include displaying that the document includes the hidden region.

The generating may include printing the printing data from which the detected hidden region is excluded on the printable medium according to one of an absolute coordinate and a relative coordinate.

The generating may include generating the printing data selectively by one of a host computer connected with an image forming apparatus or by the image forming apparatus.

The foregoing and/or other aspects and utilities of the present general inventive concept may be achieved by providing an image processing method, including detecting a hidden region of a document which is not displayed when the document is previewed and selectively performing one of generating a first printing data in which the detected hidden region is included and generating a second printing data from which the detected hidden region is excluded.

The selectively generating the first and second printing data may include determining whether the hidden region is included in the first or second printing data according to a user's command.

The foregoing and/or other aspects and utilities of the present general inventive concept may be achieved by providing an image forming apparatus, including an image forming unit which forms an image on a printable medium based on printing data, an image processor which generates the printing data of a document that is displayed as a preview image and a controller which controls the image processor to generate a second printing data from which a hidden region is excluded, the hidden region not being displayed when the document is previewed.

The foregoing and/or other aspects and utilities of the present general inventive concept may be achieved by providing an image processing apparatus, including an image processor which generates a first printing data of a document displayed as a preview image and a controller which receives a first signal representing the first printing data of the document, and generates a second signal representing a second printing data of the document, wherein the second signal excludes a region included by the first signal.

The controller may generate the second signal from the first signal.

The region excluded by the second signal may not be visible in a preview image of the first signal.

The controller may generate the second signal based on coordinate information of the document.

BRIEF DESCRIPTION OF THE DRAWINGS

The above and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The image processing apparatus 100 may include a personal computer (PC) while the image forming apparatus 200 may include a printer, a fax machine, a copier, etc. The image processing apparatus 100 and the image forming apparatus 200 may be connected to each other and communicate with each other. The image forming apparatus 200 receives printing data from the image processing apparatus 100, and forms an image on a printable medium such as paper, based on the received printing data. The image forming apparatus 200 may include an inkjet type or a laser type image forming apparatus, however the present general inventive concept is not limited thereto.

The image processing apparatus 100 processes a video image of a document displayed and forms printing data. For example, the document may be displayed as a preview image before being printed. The document according to the present exemplary embodiment includes texts, pictures, etc.

Figure 3:
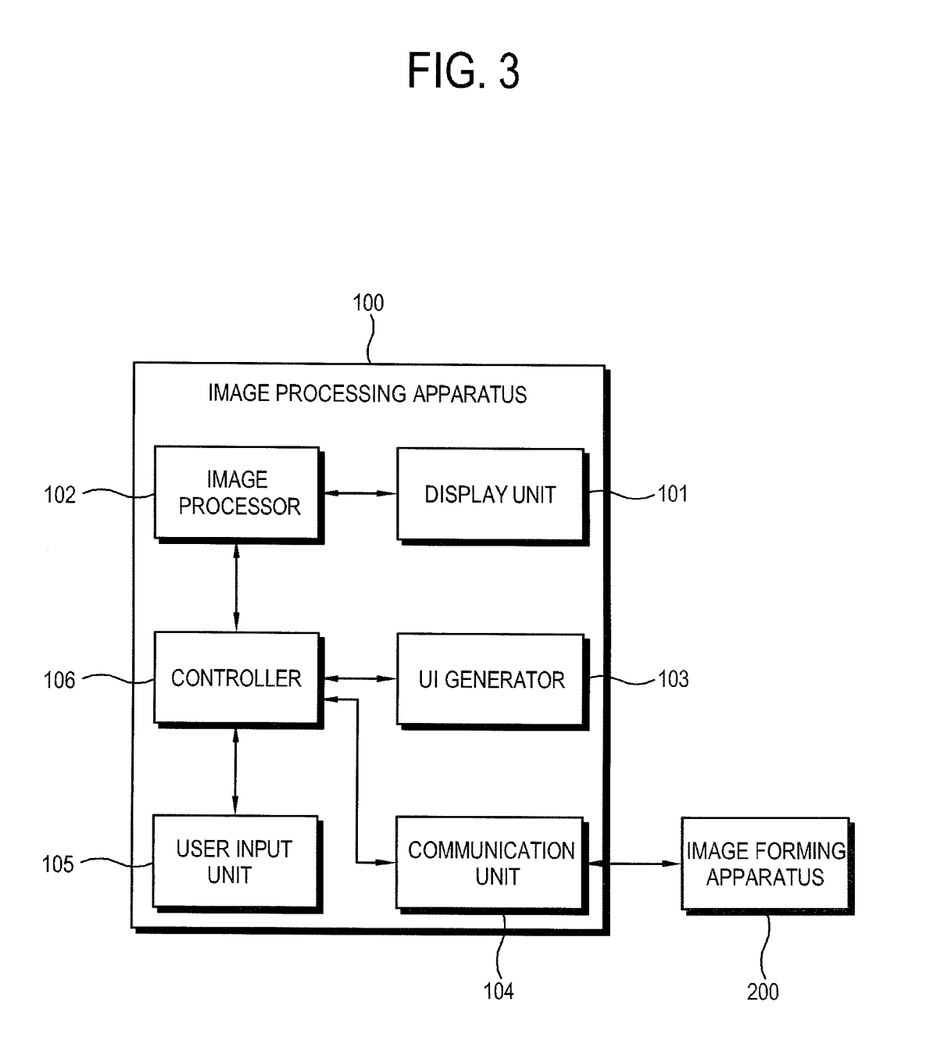
FIG. 3 is a block diagram illustrating an image processing apparatus and an image forming apparatus according to an exemplary embodiment of the present general inventive concept.

As illustrated in FIG. 3, the image processing apparatus 100 may include a display unit 101, an image processor 102, a communication unit 104 and a controller 106.

The display unit 101 displays a video image of a document. The display unit 101 may include a monitor.

The document according to the present exemplary embodiment may include a hidden region that is not displayed on the display unit 101 when the document is displayed as a preview image. The document is stored as a file, the format of which, for example, includes a portable document format (PDF) of Adobe™ System.

The image processor 102 performs halftoning on the video image displayed on the display unit 101 and generates a printing data by using a printer language according to a property of the image forming apparatus 200.

The communication unit 104 communicates with the image forming apparatus 200. The communication unit 104 transmits the printing data generated by the image processor 102 to the image forming apparatus 200 according to a control of the controller 106. The communication method between the communication unit 104 and the image forming apparatus 200 may include serial communication and parallel communication, however the present general inventive concept is not limited thereto.

Upon receiving a command to print the document from a user, the controller 106 controls the image processor 102 to generate the printing data corresponding to the video image of the document displayed on the display unit 101. If it is determined that the document includes a hidden region, the controller 106 may control the image processor 102 to exclude the hidden region from the printing data of the document.

The document may include coordinate information on a boundary of a printable medium within which the document is to be printed, and on a region of the video image of the document displayed on the display unit 101, when the document is previewed. If the document has the format of a PDF file, for example, the boundary and region may correspond to a media box and a crop box, respectively. Also, the coordinate information on the boundary and region may be indicated by "MediaBox" and "CropBox" in the PDF file. The controller 106 searches the PDF files by using keywords "MediaBox" and "CropBox", and determines whether the document includes the hidden region based on the coordinate information indicated by the "MediaBox" and "CropBox".

Figure 4:
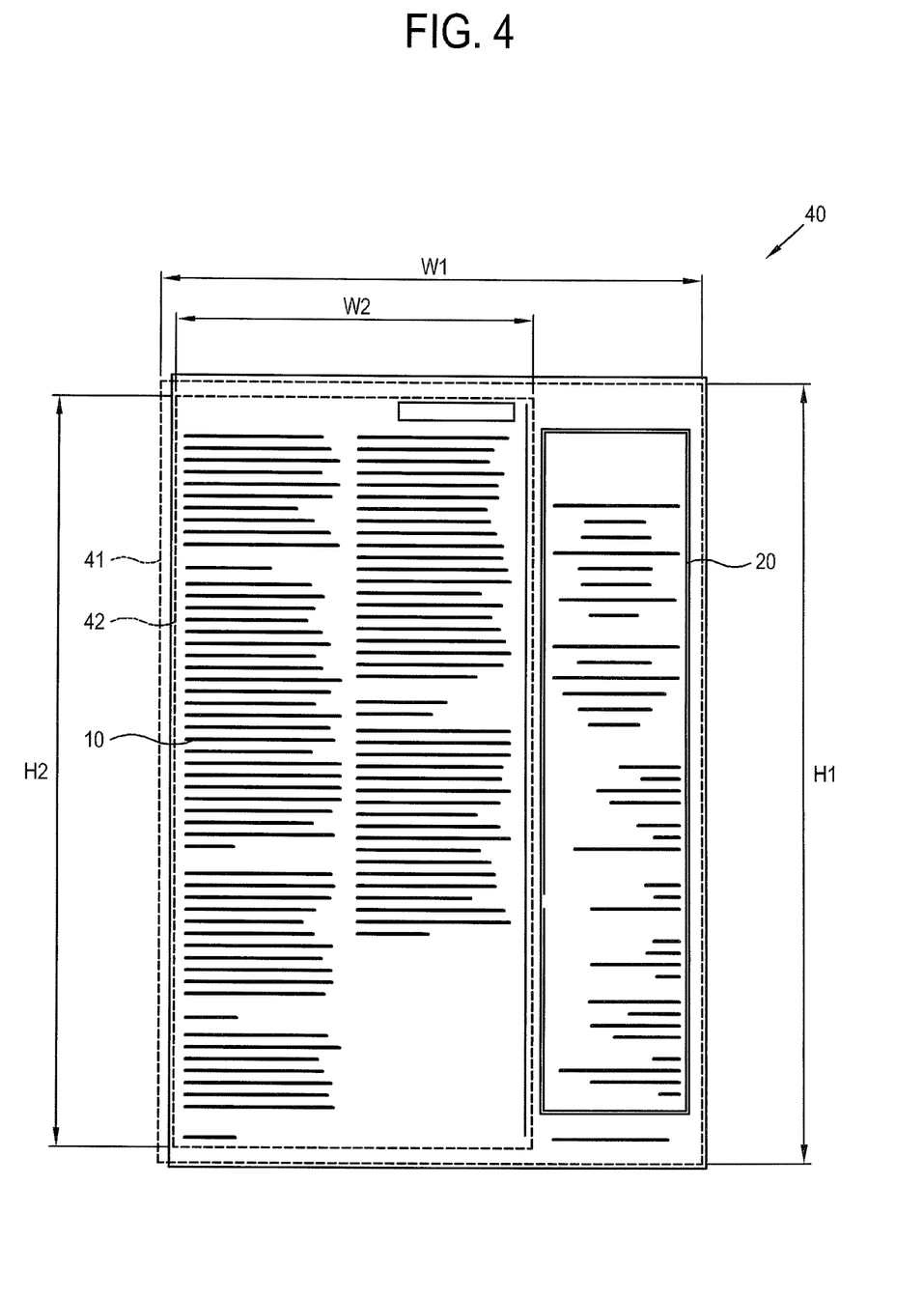
FIG. 4 is a view illustrating an example of a media box and a crop box according to the exemplary embodiment of the present general inventive concept.

More specifically, the controller 106 compares sizes of the media box and the crop box which are searched by the coordinate information. If at least one of a width and a height of the media box is larger than that of the crop box by at least a predetermined value, the controller 106 may determine that the document includes the hidden region. That is, the controller 106 compares the sizes of the actually-printed printable medium and the document displayed as the preview image to determine whether the hidden region exists. According to the present exemplary embodiment, the predetermined value may be approximately 100 pixels. However, the present general inventive concept is not limited thereto. FIG. 4 illustrates a media box 41 whose width W1 is larger than a width W2 of a crop box 42 by at least 100 pixels. As illustrated in FIG. 4, the reference numeral 40 refers to the document, the reference numeral 10 represents a video image displayed on the display unit 101 when the document is being previewed. The reference numeral 20 refers to the hidden region, while the reference numerals H1 and H2 are the heights of the media box 41 and the crop box 42, respectively.

Figure 5:
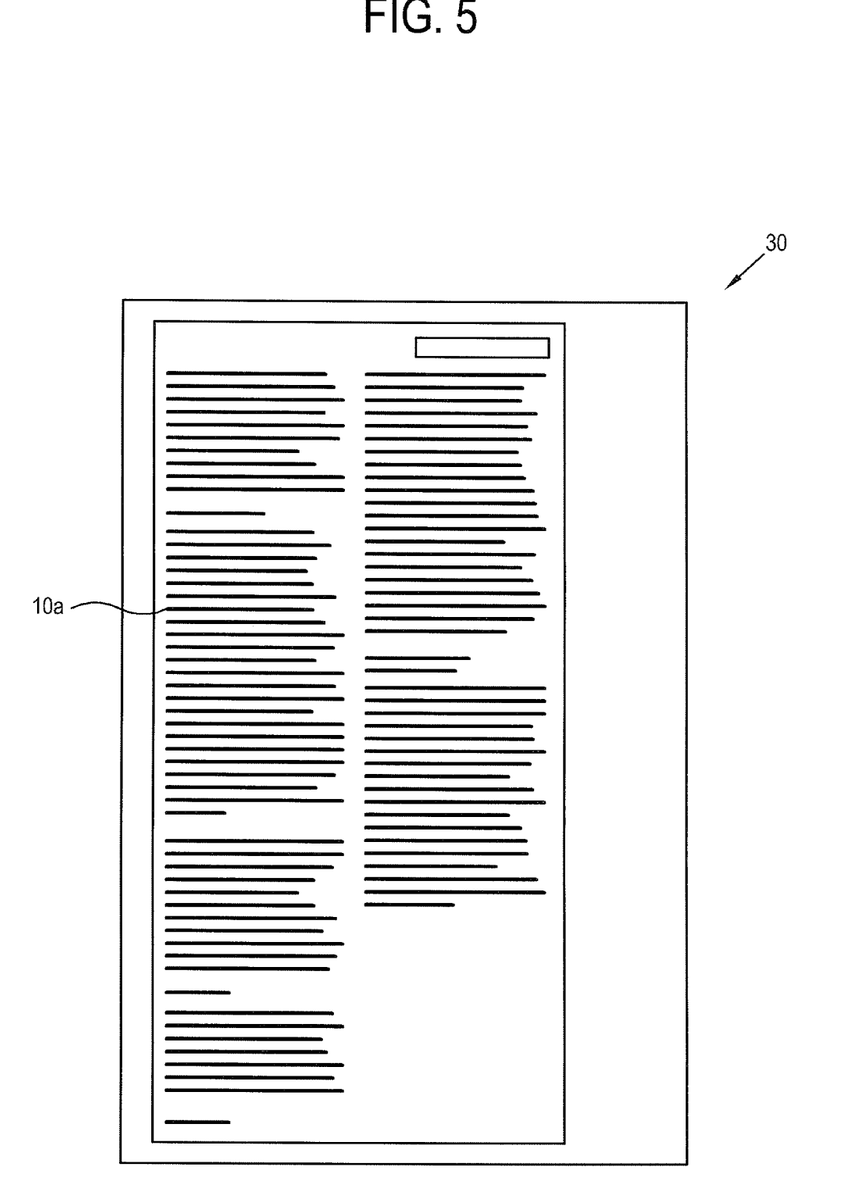
FIG. 5 is a view illustrating an example of a document that is printed without a hidden image according to the exemplary embodiment of the present general inventive concept.

As illustrated in FIG. 4, if it is determined that the document 40 includes the hidden region 20, the controller 106 controls the image processor 102 to generate the printing data corresponding to the crop box 42 of the document 40. Then, the hidden region 20 of the printing document 40 is neither included in the crop box 42 nor in the printing data. Thus, the hidden region 20, which is not displayed on the display unit 101 when the document is being previewed, is not printed. FIG. 5 illustrates an example of a printable medium 30 which is printed without the hidden region 20. As illustrated therein, a print image 10a corresponding to the video image 10 is formed on the printable medium 30, and the hidden region 20 is not printed thereon.

The print image 10a may be formed on the printable medium 30 according to one of an absolute coordinate, i.e. a fixed coordinate, and a relative coordinate, i.e. an alignable coordinate. The relative coordinate includes left alignment, center alignment, right alignment and justification alignment.

As illustrated in FIG. 4, if it is determined that the document 40 does not include the hidden region 20, the controller 106 controls the image processor 102 to generate the printing data corresponding to the media box 41 of the document 40.

According to another exemplary embodiment, the hidden region 20 may be selectively printed. For example, the image processing apparatus 100 further includes a user input unit 105 which receives a command from a user whether or not to print the hidden region 20 as illustrated in FIG. 3. The controller 106 may determine whether or not to print the hidden region 20 according to the user's command.

Figure 6:
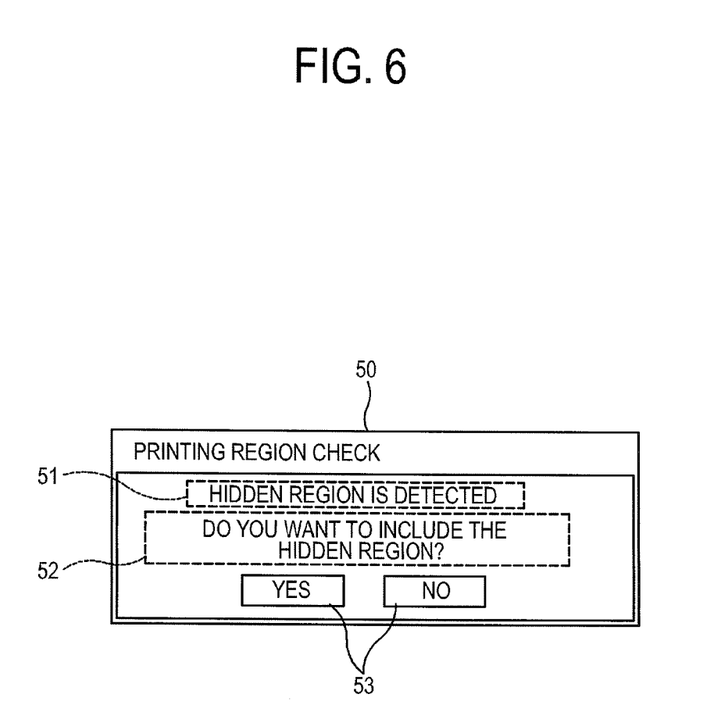
FIG. 6 is a view illustrating a user interface (UI) according to the exemplary embodiment of the present general inventive concept.

Also, a user may be informed, in advance, that the hidden region 20 will be included in the printing data. For example, the image processing apparatus 100 further includes a user interface (UI) generator 103 which generates a UI to be displayed on the display unit 101 as illustrated in FIG. 3. If it is determined that the document includes the hidden region 20, the controller 106 may control the display unit 101 to display a phrase 51 on a UI 50 to inform the user of the detection of the hidden region 20 as illustrated in FIG. 6. The UI 50 may include a message 52 to ask a user whether or not to print the hidden region 20, and an item 53 to select whether or not to print the hidden region 20.

According to the present exemplary embodiment, a user may determine whether or not to print the hidden region 20. That is, a user may set the desired printed region of the document.

The image processor 102 and the controller 106 may include hardware and software. For example, the image processor 102 and the controller 106 may include a nonvolatile memory (not illustrated) which stores an image processing program and a control program corresponding to operations of the image processor 102 and the controller 106, a volatile memory (not illustrated) which loads a part or all of the image processing program and the control program, and a processor (not illustrated) which executes a code of the image processing program and the control program loaded into the volatile memory. The nonvolatile memory may include a hard disk drive (HDD), a ROM, a flash memory or the like. The volatile memory may include DDR RAM (double data rate RAM) or the like.

The image processing program and the control program may include a combination of an operating system such as Microsoft Windows, and a printer driver. The printer driver may be designed to correspond to a property of the image forming apparatus 200.

Figure 7:
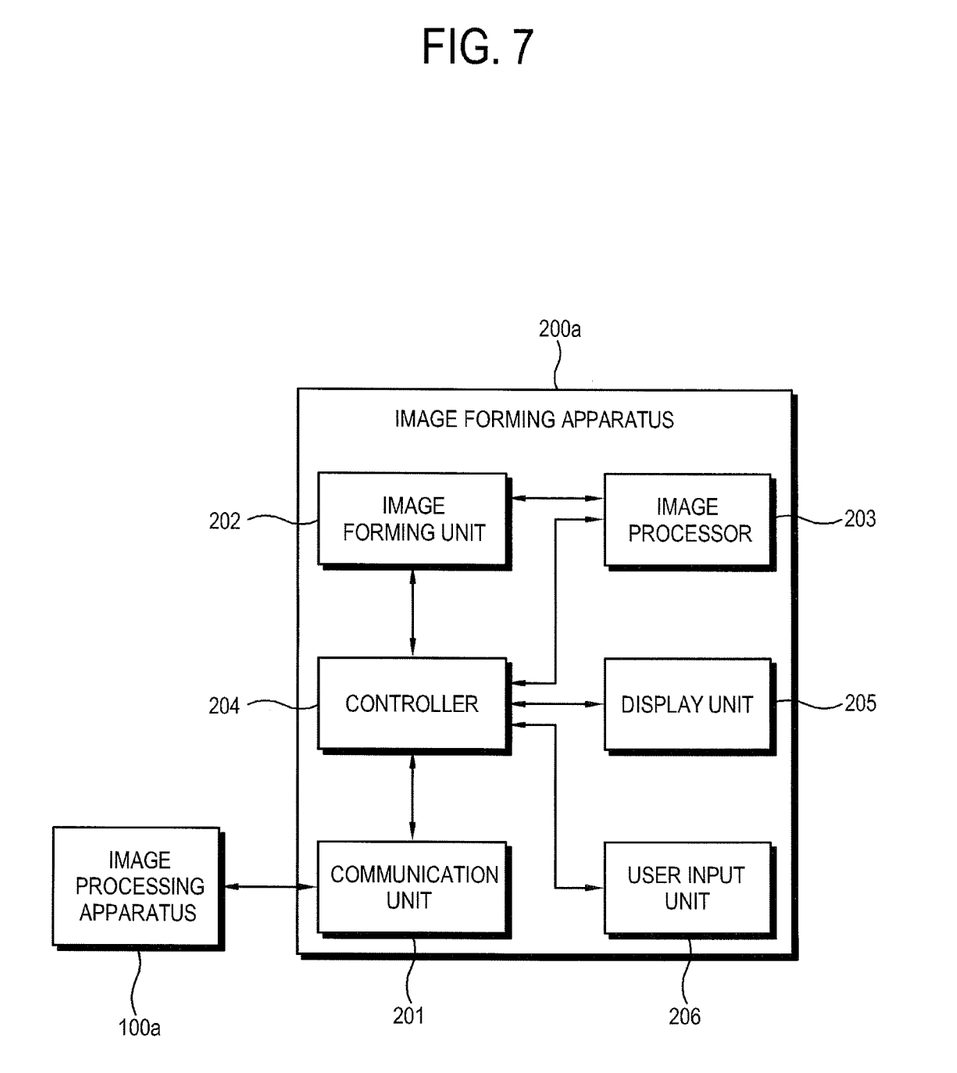
FIG. 7 is a block diagram illustrating an image processing apparatus and an image forming apparatus according to another exemplary embodiment of the present general inventive concept.

Hereinafter, an image processing apparatus and an image forming apparatus according to another exemplary embodiment of the present invention will be described. FIG. 7 is a block diagram of an image processing apparatus 100a and an image forming apparatus 200a according to another exemplary embodiment of the present invention. According to the present exemplary embodiment, the image forming apparatus 200a determines whether a document includes a hidden region, and processes a video image to exclude the hidden region from the printing data of the video image. A detailed description of equivalent and/or similar parts of the image processing apparatus 100a and the image forming apparatus 200a in FIG. 7 with respect to those described in FIG. 3 will be omitted here.

As illustrated in FIG. 7, the image forming apparatus 200a may include a communication unit 201, an image forming unit 202, an image processor 203 and a controller 204. The communication unit 201 communicates with the image processing apparatus 100a and receives printing data therefrom. The image processor 203 processes the printing data transmitted by the communication unit 202. The image forming unit 201 forms a print image on a printable medium based on the printing data processed by the image processor 203. The controller 204 determines whether the document includes a hidden region. If the document includes the hidden region, the controller 204 controls the image processor 203 to exclude the hidden region from the printing data of the document. The image forming apparatus 200a may further include a display unit 205 to display a UI informing the hidden region, and a user input unit 206 to receive a command from a user and select whether or not to print the hidden region.

Figure 8:
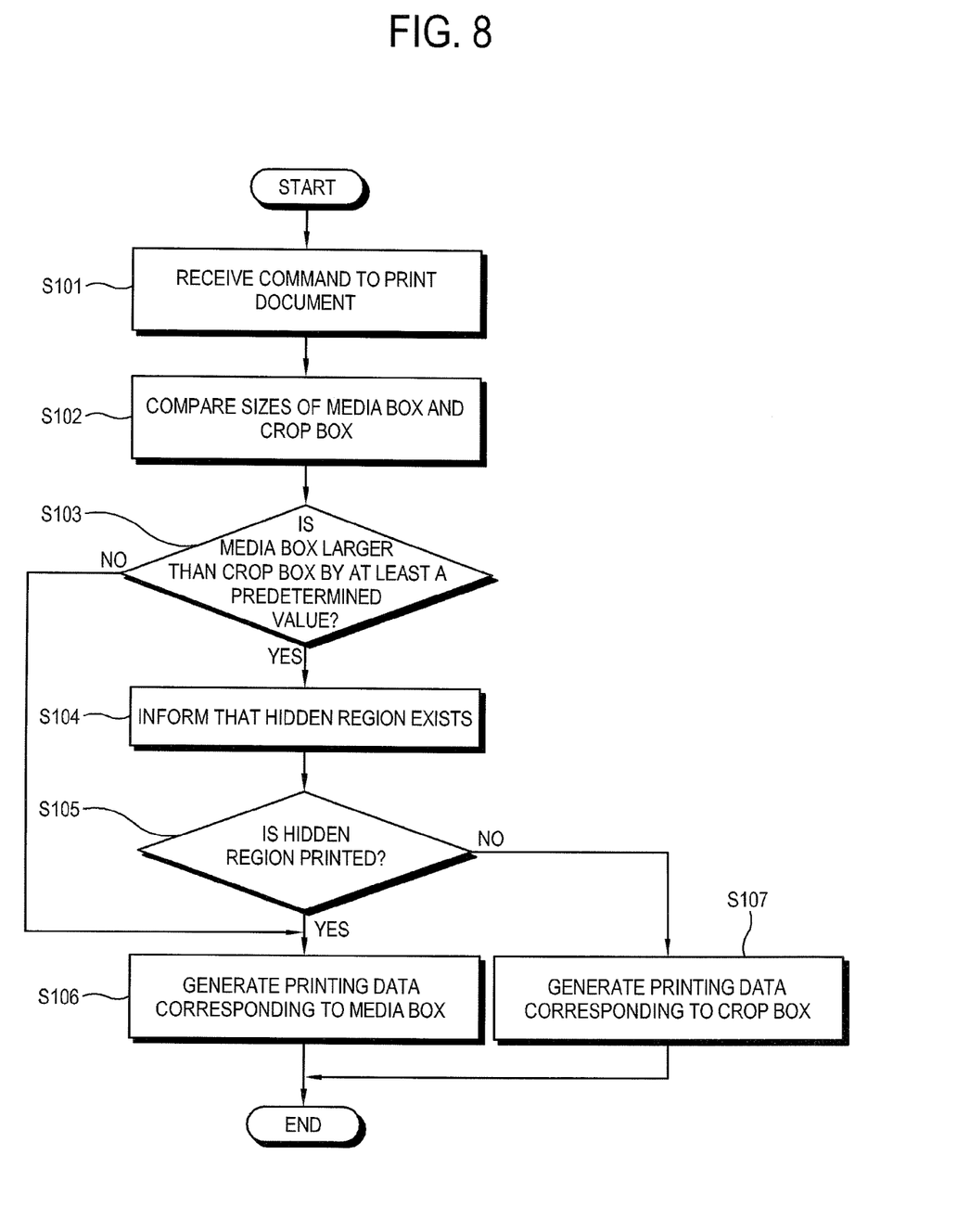
FIG. 8 is a flowchart illustrating an image processing method according to the exemplary embodiment of the present general inventive concept.

FIG. 8 is a flowchart which illustrates an image processing method according to the exemplary embodiment of the present invention. The image processing method of the present exemplary embodiment may be realized by the image processing apparatus 100 and the image forming apparatus 200 in FIG. 3 or by the image processing apparatus 100a and the image forming apparatus 200a in FIG. 7.

First, a command is received from a user to print the document that is displayed as the preview image (S101). The file of the document to be printed is searched and sizes of a media box and a crop box of the document are compared to determine whether the document includes a hidden region (S102). At least one of a width and a height of the media box and the crop box may be compared. However, the present general inventive concept is not limited thereto and may include comparisons of the media box and the crop box based on memory usage or file size.

It is then determined in operation (S103) whether the media box is larger than the crop box by at least a predetermined value. If the media box is larger than the crop box by at least the predetermined value at operation S103, the user is informed that the document includes the hidden region in addition to the preview image (S104). Then, a message may be displayed to inform the user of the hidden region.

The user is then asked whether or not to print the hidden region (S105). If the user selects to print the hidden region at operation S105, the printing data is generated corresponding to the media box of the document (S106). In this case, an image corresponding to the hidden region is formed, as well as the displayed preview image.

If a user selects not to print the hidden region at operation S105, the printing data is generated corresponding to the crop box of the document (S107). Then, only the preview image displayed on the display unit is formed on the printable medium, and a print image corresponding to the hidden region is not formed on the printable medium.

If it is determined at operation S103 that the media box is not larger than the crop box by at least the predetermined value, the operation S106 is performed.

As described above, the present general inventive concept provides an image processing apparatus, an image processing method and an image forming apparatus thereof which do not print an unexpected part or region of a document and thereby improves a user's convenience.

Also, the present general inventive concept provides an image processing apparatus, an image processing method and an image forming apparatus thereof which do not print an unexpected part or region of a printing document and thereby prevents or reduces waste of consumables.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An image processing apparatus, comprising:
an image processor which generates a first printing data of a document displayed as a preview image; and
a controller which controls the image processor, based on a detection of a hidden region, to generate a second printing data from which the detected hidden region is excluded, the hidden region not being displayed when the document is previewed.

2. The image processing apparatus according to claim 1, wherein the controller compares a size of a printable medium on which the document is to be printed, and a size of the displayed document to detect the hidden region.

3. The image processing apparatus according to claim 2, wherein the controller compares the size of the printable medium and the size of the displayed document by using coordinate information.

4. The image processing apparatus according to claim 1, wherein the controller displays that the document includes the hidden region.

5. The image processing apparatus according to claim 1, wherein the second printing data from which the hidden region is excluded is printed on the printable medium according to one of an absolute coordinate and a relative coordinate.

6. An image processing apparatus, comprising:
an image processor which generates a first printing data of a document that is displayed as a preview image; and
a controller which controls the image processor to selectively perform one of generating the first printing data in which a hidden region is included and generating a second printing data from which the hidden region is excluded, the hidden region not being displayed when the document is previewed.

7. The image processing apparatus according to claim 6, further comprising a user input unit which receives a command from a user, wherein
the controller determines whether to include the hidden region in the second printing data according to the user's command.

8. An image processing method, comprising:
detecting a hidden region of a document which is not displayed on a display screen when the document is previewed; and
generating printing data to exclude the detected hidden region from the printing data.

9. The image processing method according to claim 8, wherein the detecting the hidden region comprises comparing a size of a printable medium on which the document is to be printed, and a size of the displayed document.

10. The image processing method according to claim 9, wherein the comparing the size of the printable medium and the size of the document comprises comparing the size of the printable medium and the size of the displayed document by using coordinate information.

11. The image processing method according to claim 8, further comprising displaying that the document includes the hidden region.

12. The image processing method according to claim 8, wherein the generating comprises printing the printing data from which the detected hidden region is excluded on the printable medium according to one of an absolute coordinate and a relative coordinate.

13. The image processing method according to claim 8, wherein the generating comprises generating the printing data selectively by one of a host computer connected with an image forming apparatus or by the image forming apparatus.

14. An image processing method, comprising:
detecting a hidden region of a document which is not displayed on a display screen when the document is previewed; and
selectively performing one of generating a first printing data in which the detected hidden region is included and generating a second printing data from which the detected hidden region is excluded.

15. The image processing method according to claim 14, wherein the selectively generating the first and second printing data comprises determining whether the hidden region is included in the first or second printing data according to a user's command.

16. An image forming apparatus, comprising:
an image forming unit which forms an image on a printable medium based on printing data;
an image processor which generates the printing data of a document that is displayed as a preview image; and
a controller which controls the image processor to generate a second printing data from which a hidden region is excluded, the hidden region not being displayed when the document is previewed.

17. An image processing apparatus, comprising:
an image processor which generates a first printing data of a document displayed as a preview image; and
a controller which receives a first signal representing the first printing data of the document and generates a second signal representing a second printing data of the document,
wherein the first signal includes a region excluded by the second signal.

18. The image processing apparatus according to claim 17, wherein the controller generates the second signal from the first signal.

19. The image processing apparatus according to claim 18, wherein the region excluded by the second signal is not visible in a preview image of the first signal.

20. The image processing apparatus according to claim 19, wherein the controller generates the second signal based on coordinate information of the document.

21. An image processing apparatus, comprising:
a controller to generate first printing data corresponding to a document and second printing data corresponding to the document without a detected hidden region based on the detection of the hidden region; and
a user interface to allow a user to choose whether to display the first printing data or the second printing data as a preview image.

22. The image processing apparatus of claim 21, further comprising:
a printing unit to print the displayed preview image based on the user's choice.

* * * * *